April 18, 1950 W. E. CALDWELL, JR 2,504,390
REFRIGERATOR BREAKER FRAME
Filed July 13, 1945 3 Sheets-Sheet 1
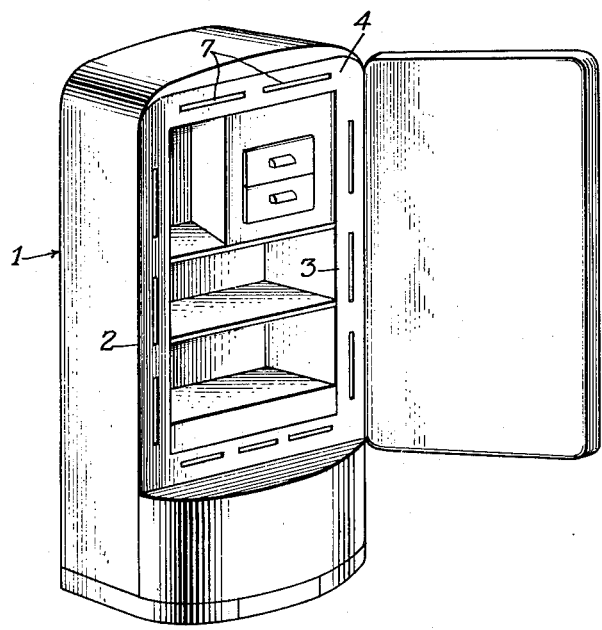
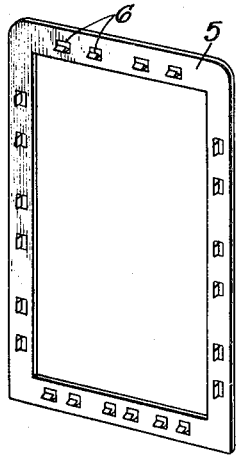
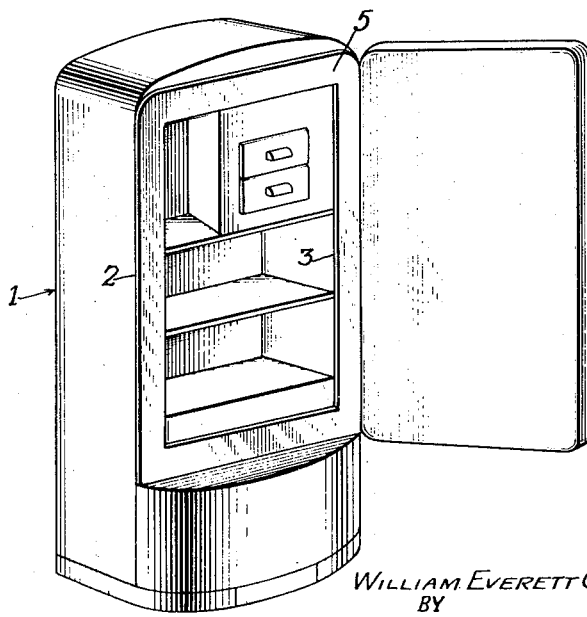
INVENTOR.
WILLIAM EVERETT CALDWELL JR.
BY
ATTORNEYS.

April 18, 1950     W. E. CALDWELL, JR     2,504,390
REFRIGERATOR BREAKER FRAME
Filed July 13, 1945     3 Sheets-Sheet 2
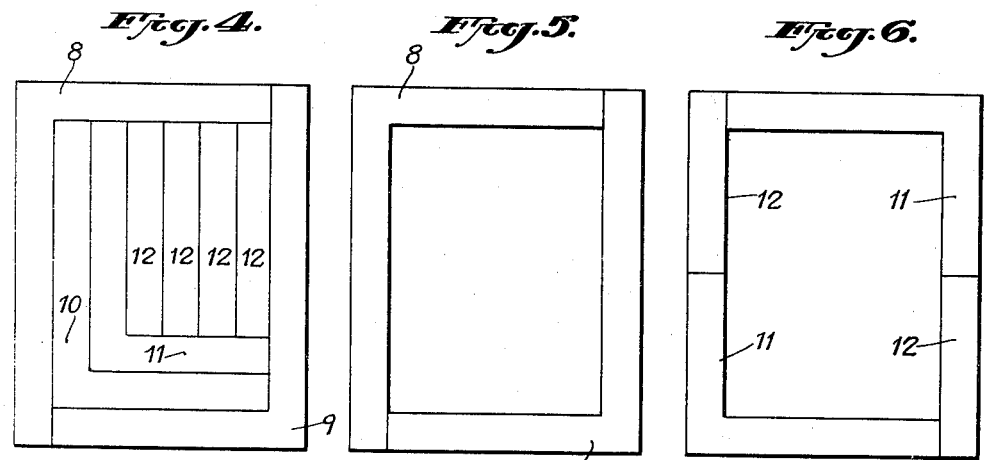
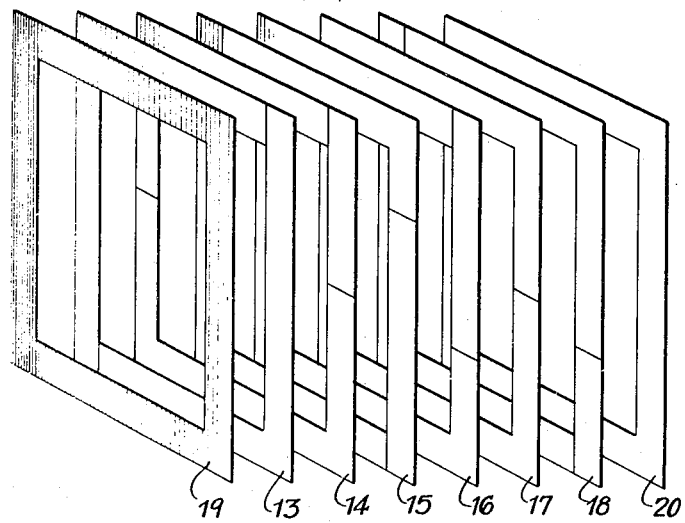
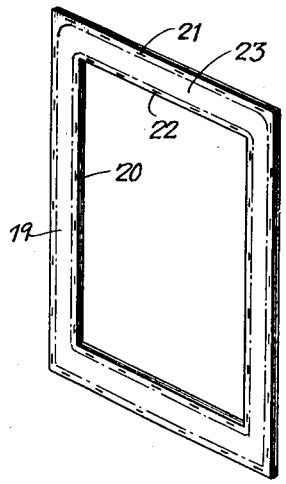
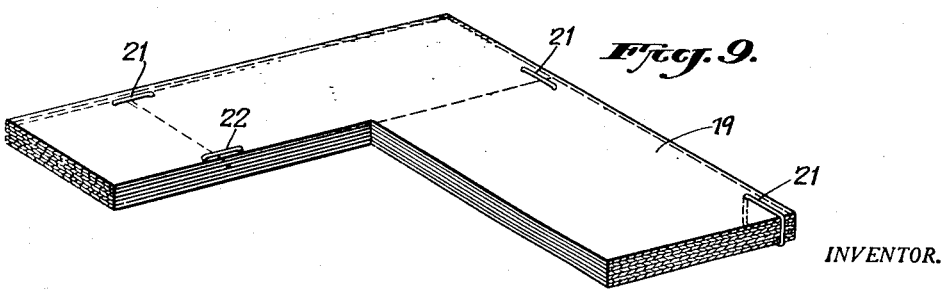
INVENTOR.
WILLIAM EVERETT CALDWELL JR
BY
ATTORNEYS.

April 18, 1950 W. E. CALDWELL, JR 2,504,390
REFRIGERATOR BREAKER FRAME
Filed July 13, 1945 3 Sheets-Sheet 3
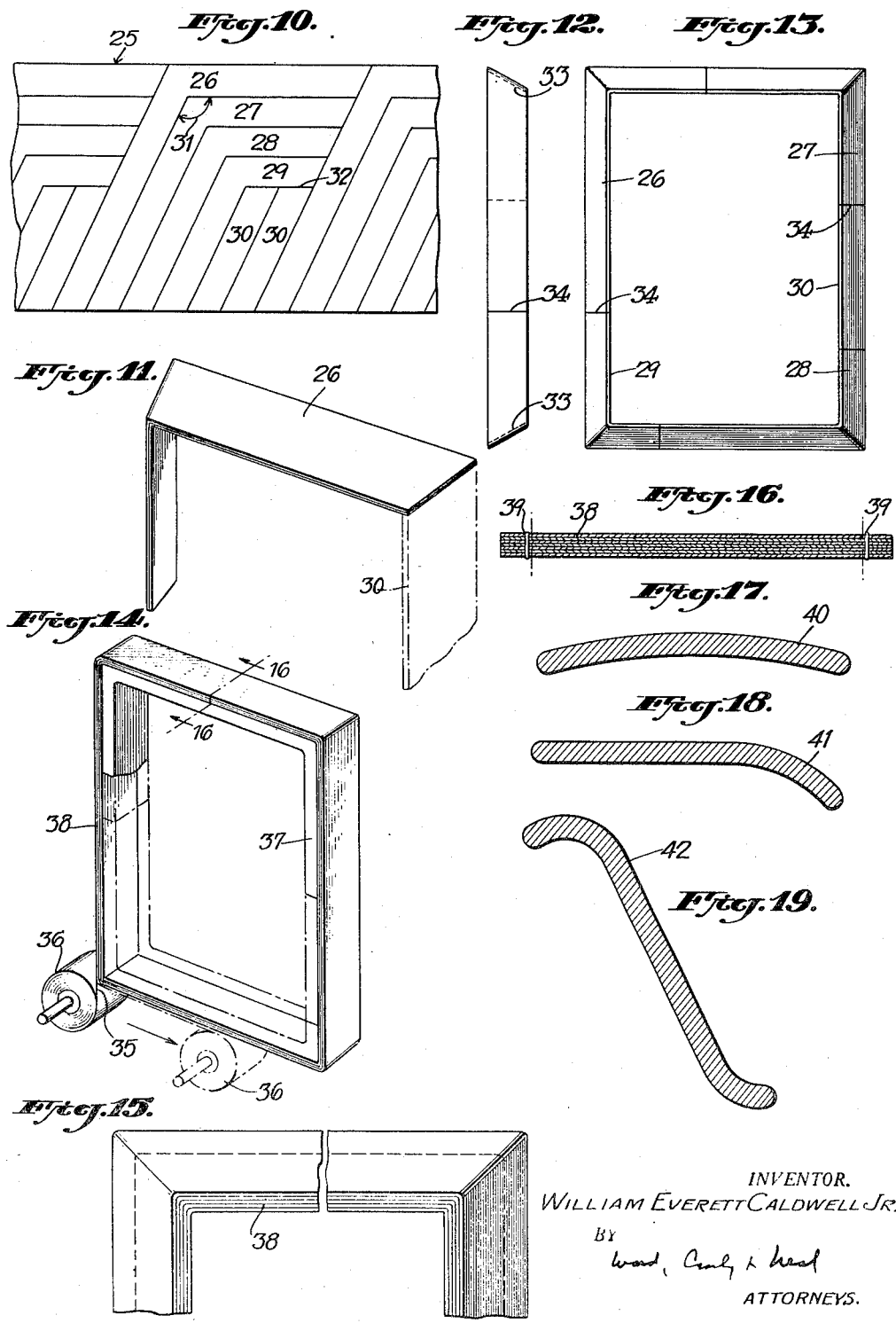
INVENTOR.
WILLIAM EVERETT CALDWELL JR.
BY
ATTORNEYS.

Patented Apr. 18, 1950

2,504,390

UNITED STATES PATENT OFFICE 2,504,390

REFRIGERATOR BREAKER FRAME

William Everett Caldwell, Jr., Trenton, N. J., assignor to St. Regis Paper Company, New York, N. Y., a corporation of New York Application July 13, 1945, Serial No. 604,779

2 Claims. (Cl. 20—74)

This invention pertains to unitary, built-up, frame-like structures of laminated plastic material and, more especially, to such as are employed as door frames or so-called "breaker frames" on refrigerators and the like, for minimizing heat transfer between the outer shell and the inner tank of the refrigerator cabinet.

Heretofore, refrigerator breaker frames have been made up in the form of four separate strips of laminated plastic material, which are drilled for reception of screws, and fitted about the door opening or throat of the refrigerator cabinet in the form of screw-attached breaker strips, forming in aggregate the complete breaker frame. This construction has been employed in order to avoid the excessive waste of laminated plastic material, such as would result from forming the laminate of unitary frame-like punchings of the resin varnish impregnated sheet or base material, in which construction the entire central portion of each punching would be waste material.

In accordance with my invention, I propose to eliminate this waste material, while at the same time forming the breaker frame as a unitary frame-like structure. In accordance with one modification of my invention, I propose to accomplish this by cutting the sheet-like base material to be laminated into straight strips and angles, utilizing all or substantially all of the base material for this purpose, and thereupon building up each rectangular layer of the laminate from two or more of these straight strips or angles. The strips and angles are so cut that, when properly fitted together preferably with butt joints, all laminae will have the desired frame-like configuration of the same dimensions. The cutting of the base material is so designed that, when the successive laminae are superimposed upon each other to form the built-up laminate, the joints of one layer will be disposed in staggered relation to those of the adjacent layers, in order to prevent any weakness of the subsequently molded frame, and to prevent any lines from showing on the surface thereof, such as would otherwise detract from its appearance. The lengths and sizes of these strips and angles will be governed by their layout on the flat sheet of resin varnish impregnated base material from which they are to be cut. The layout is designed to produce a minimum of waste material. Preferably, the surface layers of the so built-up laminate are made from single punchings of the treated sheet like base material, in order to prevent any lines or junctures from appearing thereon, whereby the finished laminate has the appearance of being made from successive layers of unitary frame-like punchings.

The laminae in the form of the so pieced together rectangles, having an open center, are superimposed on each other to the desired overall thickness, and the components thereof temporarily fastened together by stapling or other means at portions of the material which are to be trimmed off during subsequent molding and consolidating by hot pressing, or in a later finishing operation. The build-up, as thus produced, is then placed, with the aid of a loading device, into a suitable mold and consolidated, by heat and pressure, into the desired final thickness and shape. The frame is then ready for the final finishing operations, such as trimming of the inside and outside edges, punching of screw holes therein for frames to be screw-attached, etc.

During the hot-pressing or molding operation, the so built-up frame may be molded flat or with a bevel, or may be appropriately curved, or curved and beveled, etc., depending on the ultimate shape desired for any particular application, and in conformity with the contour of the mold employed for hot pressing.

Some advantages of the procedure above outlined are utilization of approximately all of the treated base material, in place of utilizing less than half of the base material if the frame is formed of built-up unitary punchings; elimination of lines on the surface, which are highly objectionable, by staggering the joints of each lamina, etc., combined with the use of unitary surface laminae. Some advantages of the resulting construction are: fewer pieces to handle at the time of assembly of the refrigerator, as compared for example to the four-piece breaker frame construction presently in vogue; elimination of the corner problem presented by the four-piece construction, where suitable means for covering the corner joints must be supplied; and hence an improvement in the appearance of the throat of the refrigerator due to the unitary breaker-frame construction of the present invention in comparison with the four-piece construction.

In refrigerator assemblies where a breaker-frame construction is desired having an extremely deep bevel, a modified construction in accordance with the present invention may be employed. In this modified construction, a roll of the resin varnish impregnated or treated base material, having an appropriate width, is wound in successive layers or convolutions about a mandrel which preferably is of rectangular form, until a desired number of laminae are thus superimposed one upon the other. The laminate thus formed is then removed from the form and the components thereof temporarily integrated by staples or the like, inserted in portions to be subsequently trimmed off, for example, along the edges. At this stage, the laminate has the appearance of an open-ended rectangle, the sides of which are parallel to the axis. The laminate is then placed in a mold shaped to impart a deep bevel to the laminate, which is thereupon consolidated by hot pressing to the desired final shape. The stapled edges are then trimmed off to provide the finished breaker frame of deeply beveled configuration. This construction, of course, is most applicable where the bevel is sufficiently deep to avoid danger of rupture or injury at the cornices.

In the drawings:

Fig. 1 is a perspective view of a refrigerator cabinet, the throat of which is provided with appropriate means for attaching thereto a one-piece breaker frame in accordance with the present invention; while Fig. 2 is a perspective view of the breaker frame itself provided with attaching means for rapid assembly on the throated portion of the cabinet. Fig. 3 is a perspective view of the refrigerator of Fig. 1 with the breaker frame of Fig. 2 in assembled relation thereon.

Fig. 4 is a plan view of a sheet of resin varnish impregnated base material, as laid out for cutting into angles and strips in accordance with the present invention, for purposes of building up the laminate without wastage. Figs. 5 and 6 are plan views of two of the pieced-together rectangular laminae obtainable from the Fig. 4 layout and subsequent cutting, Fig. 5 being composed of two of the angle cuttings obtainable from Fig. 4, while Fig. 6 is composed of two angle cuttings and two straight strips pieced together in the form of butt joints along the contiguous edges.

Fig. 7 is an exploded, perspective view of the successive layers of the laminae as arranged for superimposed assembly, this view also illustrating the relative positioning of the butt joints such that those of one lamina are disposed in staggered relation to those of the adjacent laminae. Fig. 7 also shows the application of surface punchings for the laminate, which are of continuous and unitary construction, and each comprising a single punching from a base material.

Fig. 8 is a perspective view of the laminae of Fig. 7 as assembled in superimposed relation and stapled together along the edges prior to hot pressing.

Fig. 9 is an enlarged sectional detail, in perspective, of the Fig. 8 construction to illustrate the same more specifically.

Fig. 10 is a view in elevation of a section of the resin varnish impregnated base material, as laid out for cutting the angle members and straight pieces, on a bias, for purposes of assembly into a built-up, one-piece breaker frame having a beveled configuration.

Fig. 11 is a perspective view of one of the angle pieces of Fig. 10, as bent along the angle thereof into position to form the built-up beveled frame. Fig. 12 is a view in side elevation, and Fig. 13 the corresponding view in front elevation of one of the pieced-together laminae formed from two angle members and two strips of the Fig. 10 layout and resulting in the beveled construction aforesaid.

Fig. 14 is a perspective view illustrating the aforesaid modification of the invention, according to which the laminate is formed from a roll of treated base material wound, in successive layers or convolutions, about a rectangular form or mandrel for producing a one-piece breaker frame having deeply beveled edges; while Fig. 15 is a partial plan view showing the resulting product obtained after hot pressing and trimming of the stapled edges. Fig. 16 is a transverse sectional view of the Fig. 14 laminate after stapling along the edges and prior to hot pressing and trimming.

Figs. 17, 18 and 19 are sectional views, similar to Fig. 16, but showing various cross-sectional shapes of the breaker frame that may be obtained, in accordance with the invention, after hot pressing or molding.

Referring to Figs. 1 to 3, the refrigerator cabinet, shown generally at 1, includes an outer shell 2 and an inner tank 3 terminating in a door opening or throated portion 4. A laminated plastic breaker frame 5, of unitary built-up construction in accordance with the present invention, has secured about the periphery of its exposed face a plurality of metal-attaching clips, such as 6, these metal clips being adapted to enter corresponding slots 7 provided about the periphery of the refrigerator throat 4, whereby the breaker frame 5 may be assembled on the throated portion 4 by merely exerting sufficient pressure to cause the metal clips 6 to enter the slots 7. This method and means for rapid assembly are covered in a copending application of Bernard Jaffe, Serial No. 600,948, filed June 22, 1945, now abandoned. Fig. 3 shows the refrigerator cabinet 1 with the breaker frame 5 as thus assembled on the throated portion 4 of the cabinet.

Referring now to Figs. 4 to 9 inc., a sheet of resin varnish impregnated base material, such as alpha cellulose paper or the like impregnated with a thermosetting phenol-formaldehyde resin varnish, is laid out in accordance with angles, such as 8 to 11, and straight strips 12, and is cut into sections as thus laid out. These angles and straight strip portions are thereupon assembled, in butt-joint relation, into a plurality of frame-like forms of the same dimensions, as illustrated in Figs. 5 and 6, wherein Fig. 5 is composed of the angle portions 8 and 9, while Fig. 6 is composed of angle portions, such as 11, and straight strips, such as 12, trimmed to proper lengths to conform to the built-up rectangle of Fig. 5. In this way are formed the various built-up rectangles 13 to 18 inc. of Fig. 7, which are thereupon assembled in the relation shown in Fig. 7. The surface sheets 19 and 20 of the thus built-up laminate are preferably formed of unitary, rectangular punchings from other base material, thereby to avoid the occurrence of any butt joints on the surfaces of the finished laminate. The laminae 13 to 20 inc. of Fig. 7 are arranged in superimposed relation, as shown in Fig. 8, and the components thereof temporarily stapled together along the inner and outer edges as shown, for example, at 21, 22, the thus built-up laminate being now ready for consolidation by the hot-pressing operation.

The hot pressing is carried out in accordance with standard practice, for example, in a mold employing pressures of about 1000 to 1500 pounds per square inch, and temperatures of about 150 to 200° C. The molds may be arranged so that, during the hot-pressing operation, the stapled edges 21, 22 are sheared off to reduce the dimensions of the breaker frame substantially to its final contour, as indicated by the dotted lines 33, so that the edges thereof need be subjected only to a final finishing operation; or a flat-type mold may be employed which merely consolidates the laminae, the shearing being carried out in a subsequent operation, also in accordance with standard practice. The operations of Figs. 4 to 9 will produce a one-piece built-up breaker frame substantially in accordance with that shown in perspective in Fig. 2.

Referring now to Figs. 10 to 13 inclusive, illustrating one procedure for producing a built-up one-piece breaker frame of beveled configuration, a sheet of the resin varnish impregnated base material, illustrated generally at 25, Fig. 10, is laid out in accordance with angle portions, such as 26, 27, 28, 29, and straight strips, such as 30, the angles and strips in this instance being laid out on a bias, as shown, so that the angle portions form obtuse angles such as 31, while the straight strips have beveled upper and lower edges as at 32.

The angle 31 is such that, when an angle member, such as 26, is bent into the form of the finished product, the sides thereof will be perpendicular to each other as shown in Fig. 11. Figs. 12 and 13 show one of the built-up laminae consisting, for example, of angle portions, such as 26 to 29 inclusive, and straight strips such as 30, the strips and angles forming butt joints, as at 34, of the build-up. The various laminae, as thus formed, are superimposed and the components thereof stapled together along the edges in the manner illustrated in Fig. 8, and the resulting structure subjected to a hot-pressing operation for consolidating the laminae.

Referring now to Figs. 14 to 16, a one-piece breaker frame having a deep bevel is formed by progressively winding the treated base material 35, supplied from a roll 36 thereof of appropriate width, about a rectangular form 37, until a laminate 38 having a sufficient number of superimposed layers is obtained. The roll 36 is thereupon cut and the form 37 removed, following which the laminae are temporarily fastened together along the edges by stapling, as shown at 39, Fig. 16. Thereupon, the structure 38 is consolidated under heat and pressure in a mold adapted to provide the beveled configuration, following which the laminate is trimmed to final size, this trimming removing the stapled edges 39, the final structure being as shown in Fig. 15.

By the use of appropriately shaped molds, any desired cross-sectional configuration for the resulting laminate can be obtained, such as illustrated at 40, Fig. 17; 41, Fig. 18; or 42, Fig. 19.

In the foregoing constructions, any suitable resin-impregnated, sheet-like base material or stock may be employed such, for example, as paper or other cellulose fibrous sheet material, or glass or asbestos mat or cloth, etc., impregnated, preferably, with a thermosetting synthetic resin varnish, such as a varnish made from any of the straight phenol-aldehyde resins, or these modified with, for example, aniline or aniline-aldehyde reaction products; or urea, thiourea, aniline-aldehyde, melamine-aldehyde, or alkyd resins, etc., alone or as modifiers of phenolic resins, and either with or without internal or external plasticizers, extenders, etc.

As above stated, the successive rectangular laminae of the Figs. 1 to 13 inclusive modifications are, preferably, built up of angles and strips forming butt joints. However, overlap joints may be employed if the resin varnish impregnated base material is sufficiently thin that the overlapping will not show up on the surface of the finished frame member.

I claim:

1. A refrigerator breaker frame, comprising a laminated plastic, frame-like structure consisting of superimposed laminae of fibrous sheet material impregnated with and united by a synthetic resin, the individual laminae consisting of strips and angles of said sheet material, fitting together in joints, the joints of one lamina being disposed in staggered relation with respect to those of the adjacent laminae, and snap-fastening means disposed about and integrally united with one surface of said structure for detachably securing the same to a supporting body.

2. A refrigerator breaker frame, comprising a laminated plastic, frame-like structure consisting of superimposed laminae of fibrous sheet material impregnated with and united by a synthetic resin, the inner laminae of said structure consisting of strips and angles of said sheet material fitting together in butt joints, with the joints of each lamina disposed in staggered relation to those of the adjacent laminae, and at least one surface lamina of the structure comprising a continuous strip of said material, and snap-fastening means disposed about and integrally united with one surface of said structure for detachably securing the same to a supporting body.

WILLIAM EVERETT CALDWELL, Jr.

REFERENCES CITED

The following references are of record in the file of this patent:

UNITED STATES PATENTS

| Number | Name | Date |
| --- | --- | --- |
| 1,315,896 | Wright | Sept. 9, 1919 |
| 1,467,311 | Elliott | Sept. 11, 1923 |
| 1,863,799 | Loetscher | June 21, 1932 |
| 1,954,130 | Higgins | Apr. 10, 1934 |
| 1,976,257 | Harper, Jr. | Oct. 9, 1934 |
| 2,040,365 | Diehl et al. | May 12, 1936 |
| 2,200,650 | Welch | May 14, 1940 |
| 2,233,206 | Frederick | Feb. 25, 1941 |
| 2,269,185 | Dawson | Jan. 6, 1942 |
| 2,346,566 | Ford | Apr. 11, 1944 |